United States Patent
White et al.

(10) Patent No.: US 8,287,639 B2
(45) Date of Patent: Oct. 16, 2012

(54) METHODS AND COMPOSITIONS FOR IMPROVING AIR ENTRAINMENT IN CEMENTITIOUS MIXTURES

(75) Inventors: Charles M. White, Cincinnati, OH (US); Dean A. Oester, Cincinnati, OH (US); Gary L. Pritt, West Chester, OH (US)

(73) Assignee: Cognis IP Management GmbH, Duesseldorf (DE)

( * ) Notice: Subject to any disclaimer, the term of this patent is extended or adjusted under 35 U.S.C. 154(b) by 652 days.

(21) Appl. No.: 12/107,797

(22) Filed: Apr. 23, 2008

(65) Prior Publication Data

US 2009/0031924 A1    Feb. 5, 2009

Related U.S. Application Data

(60) Provisional application No. 60/962,709, filed on Jul. 31, 2007.

(51) Int. Cl.
| | |
|---|---|
| C04B 24/08 | (2006.01) |
| C04B 7/02 | (2006.01) |
| C04B 16/00 | (2006.01) |
| C04B 24/34 | (2006.01) |
| C04B 14/00 | (2006.01) |
| C04B 24/00 | (2006.01) |

(52) U.S. Cl. .................. 106/661; 106/659; 106/728

(58) Field of Classification Search ............... 106/661, 106/664, 659, 728
See application file for complete search history.

(56) References Cited

U.S. PATENT DOCUMENTS

| | | | | |
|---|---|---|---|---|
| 3,547,665 | A * | 12/1970 | Johnson | 106/662 |
| 3,885,985 | A * | 5/1975 | Serafin et al. | 106/820 |
| 5,221,343 | A * | 6/1993 | Grauer et al. | 106/729 |
| 6,302,955 | B1 * | 10/2001 | Kerkar et al. | 106/802 |
| 2004/0122144 | A1 * | 6/2004 | Karkare et al. | 524/284 |

* cited by examiner

Primary Examiner — Anthony J Green
Assistant Examiner — Karam Hijji
(74) Attorney, Agent, or Firm — DiehlServilla LLC

(57) ABSTRACT

A method for improving air entrainment comprising the steps of: providing a compound selected from an amphoteric, an alkyl polyglycoside, an ester, a triglyceride, a triglyceride derivative, a fatty alcohol, an alkoxylated fatty alcohol, an alkoxylated polyhydric fatty alcohol, and mixtures thereof; dispersing the compound on a finely particulate carrier to form a treated carrier; and adding the treated carrier to a cementitious mixture is provided. A composition for improving air entrainment, including a compound selected from an amphoteric, an alkyl polyglycoside, an ester, a triglyceride, a triglyceride derivative, a fatty alcohol, an alkoxylated fatty alcohol, an alkoxylated polyhydric fatty alcohol, and mixtures thereof, wherein the compound is dispersed on an organic particulate carrier and added to a cementitious mixture, is also provided. The composition may be incorporated into a concrete structure.

19 Claims, No Drawings

METHODS AND COMPOSITIONS FOR IMPROVING AIR ENTRAINMENT IN CEMENTITIOUS MIXTURES

CROSS-REFERENCE TO RELATED APPLICATIONS

This application claims priority under 35 U.S.C. §119(e) to U.S. Provisional Application 60/962,709, filed Jul. 31, 2007, the entire contents of which are hereby incorporated by reference herein.

BACKGROUND OF THE INVENTION

1. Field of the Invention

The invention relates generally to concrete additives, and more particularly, to methods and compositions for improving air entrainment in cementitious mixtures.

2. Background Information

There is a growing demand for concrete in building and construction applications. The entrainment of air in cementitious materials, for example, Portland cement, concrete, mortar, and grout, is beneficial for providing resistance to cracking when the materials are subjected to cyclic changes in temperature conditions.

Air entrainment agents (AEA) may be added to cement-based mixtures to entrain microscopic voids of air in the mixture. The voids may measure from 10 microns to 250 microns in diameter. The presence of the voids is believed to alleviate internal stresses caused when moisture freezes within pores inherently formed during setting of the cement. In harsh weather locales where an air entrainment agent is needed, there may be up to ten percent (10%), by volume of the cement, of air entrained within the voids. It should be understood that as air content increases, the compressive strength of the cementitious materials is lessened.

The demands of industry require that concrete be of sufficient strength and durability. The addition of the air entraining agents results in an improved durability as the result of entrained air voids. The voids may be stabilized by the action of the surfactant-based air entraining agents, and the voids help to relieve the expansive forces encountered when water freezes within the void.

A need remains for a method for improving air entrainment for cementitious mixtures and concrete.

SUMMARY OF THE INVENTION

Briefly described, according to an aspect of the invention, a method for improving air entrainment comprises the steps of providing a compound selected from the group consisting of: an amphoteric, an alkyl polyglycoside, an ester, a triglyceride, a triglyceride derivative, a fatty alcohol, an alkoxylated fatty alcohol, an alkoxylated polyhydric fatty alcohol, and mixtures thereof; dispersing the compound on a particulate carrier to form a treated carrier; and adding the treated carrier to a cementitious mixture.

According to another aspect of the invention, a composition for improving air entrainment comprises a compound selected from the group consisting of: an amphoteric, an alkyl polyglycoside, an ester, a triglyceride, a triglyceride derivative, a fatty alcohol, an alkoxylated fatty alcohol, an alkoxylated polyhydric fatty alcohol, and mixtures thereof, wherein the compound is dispersed on a particulate carrier and added to a cementitious mixture.

According to another aspect of the invention, the composition may be incorporated into a concrete structure.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done merely for convenience and to give a general sense of the invention. The description herein should be read to include one or at least one and the singular also includes the plural unless indicated to the contrary.

According to an aspect of the invention, a method for improving air entrainment comprises the steps of providing a compound selected from the group consisting of: an amphoteric, an alkyl polyglycoside, an ester, a triglyceride, a triglyceride derivative, a fatty alcohol, an alkoxylated fatty alcohol, an alkoxylated polyhydric fatty alcohol, and mixtures thereof; dispersing the compound on a particulate carrier to form a treated carrier; and adding the treated carrier to a cementitious mixture. The compound may be a triglyceride, the triglyceride may be soybean oil, and the triglyceride may be alkoxylated. The carrier may be limestone. The cementitious mixture may include Portland cement. The cementitious mixture may include an air entrainment agent, such as vinsol resin. The compound may be used in an amount ranging from about 0.01% to about 10% by weight of the compound on the carrier.

The amphoteric compound may be a betaine, for example, cocoamide propyl betaine. The alkyl polyglycoside may be comprised of alkyl chains ranging from 8 to 20 carbons, such as a $C_8$-$C_{18}$ alkyl polyglycoside, or a $C_8$-$C_{12}$ alkyl polyglycoside. The triglyceride may be comprised of fatty acids ranging from 4 to 22 carbons in the carbon chain and may originate from vegetable or animal sources or from synthetic processes. The triglyceride may be a vegetable oil selected from the group consisting of rapeseed oil, soybean oil, sunflower oil, safflower oil, corn oil, cottonseed oil, linseed oil, coconut oil and tall oils, or may be of animal origin and selected from the group consisting of tallows, lards, chicken fat, and fish oil. The triglyceride derivative may be an alkoxylated triglyceride, or an ethoxylated triglyceride.

According to another aspect of the invention, a composition for improving air entrainment comprises a compound selected from the group consisting of: an amphoteric, an alkyl polyglycoside, an ester, a triglyceride, a triglyceride derivative, a fatty alcohol, an alkoxylated fatty alcohol, an alkoxylated fatty alcohol, and mixtures thereof wherein the compound is dispersed on a particulate carrier and added to a cementitious mixture. According to another aspect of the invention, the composition may be incorporated into a concrete structure.

Advantageously, treating a finely particulate carrier with at least one of the compounds according to an aspect of the invention improves the distribution of air voids in concrete. It has been found that the substantially evenly dispersed air voids formed in concrete according to the methods and compositions of the invention increases the sizing (specific surface area) and improves the spacing factor (air void distribution).

Suitable treatment compounds are described below.

A suitable amphoteric compound includes, but is not limited to, DEHYTON® K. DEHYTON® K is a cocoamide propyl betaine and is available from Cognis Deutschland in Germany. Other suitable amphoteric compounds may also be used, including but not limited, to N-alkyl-N,N-dimethyl ammonium glycinates, for example cocoalkyl dimethyl ammonium glycinate, N-acylaminopropyl-N,N-dimethyl ammonium glycinates, for example coco-acylaminopropyl dimethyl ammonium glycinate, and 2-alkyl-3-carboxymethyl-3-hydroxyethyl imidazolines containing 8 to 18 carbon atoms in the alkyl or acyl group and cocoacyl-aminoethyl hydroxyethyl carboxymethyl glycinate, such as DEHYTON® AB 30 coco betaine (CAS#68424-942).

A suitable alkyl polyglycoside includes, but is not limited to, AGNIQUE® PG 8107. AGNIQUE® PC 8107 is a $C_8$-$C_{10}$ alkyl polyglucoside, with a degree of polymerization (D.P.) of 1.7 and is available from Cognis Deutschland in Germany or Cognis Corporation in the U.S. Other suitable alkyl polyglycosides may also be used, including AGNIQUE® PG 8105, a $C_8$-$C_{10}$ alkyl polyglucoside, with a degree of polymerization (D.P.) of 1.5, AGNIQUE® 9116, which is a $C_9$-$C_{11}$ alkylpolyglucoside with DP=1.6, AGNIQUE® PG 264, a $C_{12}$-$C_{16}$ alkylpolyglucoside with DP=1.4, all of which are available from Cognis Deutschland, Germany or Cognis Corporation in the U.S.

A suitable ester includes, but is not limited to, Cognis-34072. Cognis-34072 is a triglyceride, which may be derived from natural or synthetic sources. The alkyl chains in the triglyceride may contain from $C_4$-$C_{22}$ carbon atoms. Suitable triglycerides may also include vegetable oils, including, but not limited to, rapeseed oil, soybean oil, coconut oil, tall oils, and mixtures thereof. Other suitable esters include, but are not limited to, esters of monohydric and polyhydric alcohols with linear or branched fatty acids, and mixtures thereof. Fatty acids include, but are not limited to, linear and branched fatty acids with from $C_{4-22}$ carbons in the alkyl chain, and mixtures thereof. Monohydric alcohols include, but are not limited to, methanol, ethanol, butanol, propanol, isopropanol, isobutanol, tert-butanol, and mixtures thereof. Polyhydric alcohols include, but are not limited to, ethylene glycol, diethylene glycol, triethylene glycol, 1,2 propylene glycol, 1,3 propylene glycol, 1,4 butylene glycol, glycerol, polyoxyethylene glycols, polyoxypropylene glycols, sorbitol, and mixtures thereof. Esters of polyhydric alcohols include, but are not limited to, complete and partial esters. A partial ester of a polyhydric alcohol includes, but is not limited to, glycerol monooleate, glycerol dioleate, glycerol monostearate, glycerol monoisostearate, and mixtures thereof.

A suitable triglyceride derivative includes, but is not limited to, an alkoxylated triglyceride, including an ethoxylated triglyceride. The degree of alkoxylation is in the range of 0-200 moles of at least one alkylene oxide selected from the group consisting of ethylene oxide, propylene oxide, butylene oxide, and combinations thereof per mole of triglyceride. Suitable ethoxylated triglycerides include, but are not limited to, AGNIQUE® SBO-5, AGNIQUE® SBO-10, AGNIQUE® SBO-20, AGNIQUE® CSO-16, AGNIQUE® CSO-25, AGNIQUE® RSO-5, AGNIQUE® RSO-10 and AGNIQUE® RSO-30.

A suitable fatty alcohol includes, but is not limited to, a fatty alcohol with an alkyl chain containing from 6-22 carbons or mixtures thereof. The alkyl chain may be either linear or branched or mixtures thereof. A suitable fatty alcohol includes a $C_8$ alcohol, LOROL® C8-98, from Cognis Corporation, a $C_{8-10}$ alcohol, LOROL® C8-10SPV from Cognis Corporation, or a $C_{12-14}$ fatty alcohol, LOROL® C12-14A from Cognis Corporation, or isostearyl alcohol.

A suitable alkoxylated fatty alcohol includes, but is not limited to, fatty alcohols with alkyl chains containing from 6-22 carbons or mixtures thereof. The fatty alcohol may be alkoxylated with from 0-200 moles of at least one alkylene oxide selected from the group consisting of ethylene oxide, propylene oxide, butylene oxide, and combinations thereof per mole of alcohol. For example, a suitable alkoxylated fatty alcohol may contain an average of about 5 moles of ethoxylate per mole of alcohol. Alternatively, a suitable alkoxylated fatty alcohol includes, but is not limited to, a $C_{6-12}$ alcohol with on average 5 moles of ethylene oxide and a $C_{16-18}$ fatty alcohol with, on average, 5 moles of ethylene oxide.

A suitable alkoxylated polyhydric fatty alcohol includes, but is not limited to, ethylene glycol, diethylene glycol, triethylene glycol, 1,2-propylene glycol, polyoxypropylene glycols, 1,3-propylene glycol, 1,4-butylene glycol, pentane-1,5-diol, hexane-1,6-diol, hexane-1,2,6-triol, glycerol and bis-(4-hydroxycyclohexyl)-2,2-propane. The polyhydric alcohol may be, but is not limited to, dihydric, trihydric, tetrahydric and pentahydric alcohols.

The polyhydric alcohol may be alkoxylated with 0-200 moles of at least one alkylene oxide selected from the group consisting of ethylene oxide, propylene oxide, butylene oxide, and combinations thereof per mole of alcohol. For example, a suitable alkoxylated polyhydric alcohol may contain an average of about 15 moles of ethoxylate and about 60 moles of propoxylate per mole of alcohol. It should be understood that when an alcohol is alkoxylated and includes at least 5 moles of EO, a distribution of ethoxylates will be present, ranging from 0 moles of EO, an average of 5 moles of EO and up to 10-14 moles of EO.

The compounds described above may be used individually or in a mixture (composition). In one aspect of the invention, a mixture of an alkyl polyglucoside and an amphoteric is provided in a ratio of 0.1% to 0.5%, and also in a ratio of 0.1% to 1.0%. In another aspect of the invention, the triglyceride is blended with sodium lauryl sulfate, or an alkoxylated fatty alcohol.

A suitable air entraining agent that may be used in conjunction with the treated carrier includes vinsol resin, available from Master Builders VR. Other suitable air entraining agents include fatty acid salts, such as MB Micro Air and Sika AEA-15, rosin soaps such as MB AE90, and sulfonated lignin salts and other sulfonated air entraining agents.

Generally, the particle size may range from 12.5 mm to 1.18 mm, from 600 microns to 75 microns, and may also be finer than 75 microns. It should be understood that there is typically a range in the size of particles, and that the invention is not limited to a specific particle size.

Cementitious materials include Portland cement, concrete, mortar and grout.

Suitable carriers include ground limestone, but other organic and inorganic carrier particles may also be used in practicing the invention.

Unless otherwise defined, all technical and scientific terms used herein have the same meaning as commonly understood by one of ordinary skill in the art to which the invention belongs. Although methods and materials similar or equivalent to those described herein can be used in the practice or testing of the invention, suitable methods and materials are described below. The materials, methods and examples are illustrative only and are not intended to be limiting.

EXAMPLE

In the following Example, two (2) concrete mixtures including Portland cement were prepared using conventional industry procedures. It is to be understood that the concrete mixture may be made in any suitable mixing device or by manual mixing. It is to be understood that although the term "Portland cement" is used in the Examples, other types of cementitious mixtures may also be suitable.

One mixture included ground limestone treated with 5.7% by weight soybean oil, at a dosage rate of 4% by weight of the Portland cement in the mixture. The other mixture was a standard Portland cement mixture. The air entraining agent used in both concrete mixtures was vinsol resin, available from Master Builders VR.

Samples of the hardened concrete were analyzed for air void analysis according to ASTM C-457.

|  | Portland Cement With treated limestone | Portland Cement |
| --- | --- | --- |
| Total Air Content | 3.6 | 6.5 |
| Specific Surface Area (in$^2$/in$^3$) | 1747 | 867 |
| Spacing Factor (in.) | 0.0031 | 0.0048 |

Based on the above, the use of a treated carrier in conjunction with an air entrainment agent improves the distribution (spacing factor) and size of the air voids (specific surface area).

It is to be understood that the mixing devices and methods used can vary and are not limited to the devices and methods described herein, as a skilled artisan will appreciate. For example, treatment may be carried out using any method of efficiently dispersing the additive on the carrier surface, such as dry blending, nebulizing, spraying, misting, or other suitable blending operations available to one skilled in the art.

The invention has been described with reference to specific embodiments. One of ordinary skill in the art, however, appreciates that various modifications and changes can be made without departing from the scope of the invention as set forth in the claims. For example, although soybean oil is used in the Example, other esters and/or triglycerides may be used, in addition to the alternative compounds disclosed herein. Accordingly, the specification is to be regarded in an illustrative manner, rather than a restrictive view and all such modifications are intended to be included within the scope of the invention.

Benefits, other advantages, and solutions to problems have been described above with regard to specific embodiments. The benefits, advantages, solutions to problems and any element(s) that may cause any benefit, advantage, or solution to occur or become more pronounced are not to be construed as a critical, required, or essential feature or element of any or all of the claims.

What is claimed is:

1. A method for improving air entrainment, comprising the steps of:
    providing a compound selected from the group consisting of: an amphoteric, an alkyl polyglycoside, an ester, an ethoxylated triglyceride, a fatty alcohol, an alkoxylated fatty alcohol, an alkoxylated polyhydric fatty alcohol, and mixtures thereof;
    dispersing separately the compound on a particulate carrier comprising limestone to form a treated carrier; and
    adding the treated carrier to a cementitious mixture.

2. The method according to claim 1, wherein the cementitious mixture includes Portland cement.

3. The method according to claim 1, wherein the cementitious mixture includes an air entrainment agent that is different from the compound.

4. The method according to claim 1, wherein the compound is used in an amount ranging from about 0.01% to about 10% by weight of the compound calculated on the total amount of the particulate carrier.

5. The method according to claim 1, wherein the amphoteric compound is a betaine.

6. The method according to claim 5, wherein the amphoteric compound is cocoamide propyl betaine.

7. The method according to claim 1, wherein the alkyl polyglycoside is a $C_8$-$C_{18}$ alkyl polyglycoside.

8. The method according to claim 1, wherein the alkyl polyglycoside is a $C_8$-$C_{12}$ alkyl polyglycoside.

9. The method according to claim 1, wherein the ethoxylated triglyceride is a $C_8$-$C_{20}$ triglyceride.

10. The method according to claim 1, wherein the ethoxylated triglyceride is a $C_{14}$-$C_{18}$ triglyceride.

11. The method of claim 3, wherein the air entrainment agent comprises a vinsol resin, a fatty acid salt, a rosin soap, or a sulfonated lignin salt.

12. The method of claim 1, wherein the compound is selected from the group consisting of: an amphoteric, an ester, a fatty alcohol, an alkoxylated fatty alcohol, an alkoxylated polyhydric fatty alcohol, and mixtures thereof.

13. The method of claim 12, wherein the compound is selected from the group consisting of: an amphoteric, a fatty alcohol, an alkoxylated fatty alcohol, an alkoxylated polyhydric fatty alcohol, and mixtures thereof.

14. The method of claim 1, wherein the step of dispersing separately comprises dry blending, nebulizing, spraying, or misting the compound onto the carrier.

15. A composition for improving air entrainment, comprising:
    a compound selected from the group consisting of: an amphoteric, an alkyl polyglycoside, an ester, an ethoxylated triglyceride, a fatty alcohol, an alkoxylated fatty alcohol, an alkoxylated polyhydric fatty alcohol, and mixtures thereof, wherein the compound is dispersed separately on a particulate carrier comprising limestone and added to a cementitious mixture.

16. The composition according to claim 15, incorporated into a concrete structure.

17. The method of claim 15, wherein the compound is selected from the group consisting of: an amphoteric, an ester, a fatty alcohol, an alkoxylated fatty alcohol, an alkoxylated polyhydric fatty alcohol, and mixtures thereof.

18. The method of claim 17, wherein the compound is selected from the group consisting of: an amphoteric, a fatty alcohol, an alkoxylated fatty alcohol, an alkoxylated polyhydric fatty alcohol, and mixtures thereof.

19. The method of claim 15, wherein the step of dispersing separately comprises dry blending, nebulizing, spraying, or misting the compound onto the carrier.

* * * * *